United States Patent [19]
Kaiser

[11] Patent Number: 5,219,505
[45] Date of Patent: Jun. 15, 1993

[54] METHOD TO MAKE AN ENDLESS, FLAT, FLEXIBLE BELT OF POURABLE PLASTICS

[75] Inventor: Franz-Josef Kaiser, Hamburg, Fed. Rep. of Germany

[73] Assignee: Balatros GmbH, Hamburg, Fed. Rep. of Germany

[21] Appl. No.: 704,811

[22] Filed: May 23, 1991

[30] Foreign Application Priority Data

May 25, 1990 [DE] Fed. Rep. of Germany ....... 4016902

[51] Int. Cl.⁵ ................ B29C 41/04; B29C 41/20; F16G 1/16; F16G 5/14
[52] U.S. Cl. .................... 264/138; 156/140; 156/141; 156/161; 156/169; 264/229; 264/275; 264/277; 264/278; 264/279; 264/279.1; 264/311; 474/260; 474/261
[58] Field of Search ............. 264/229, 228, 277, 311, 264/138, 163, 275, 278, 279, 279.1; 156/140, 141, 137, 161, 169; 474/260, 261

[56] References Cited

U.S. PATENT DOCUMENTS

| | | |
|---|---|---|
| 243,282 | 6/1881 | Maxwell .............. 264/229 X |
| 1,592,671 | 7/1926 | Nichols ............. 264/311 X |
| 3,109,202 | 11/1963 | Beckadolph et al. ......... 264/277 X |
| 3,200,180 | 8/1965 | Russ et al. ........... 264/311 X |
| 3,652,756 | 3/1972 | Van Buren .......... 264/311 X |
| 3,741,707 | 6/1973 | Baumann et al. ........ 264/311 X |
| 3,816,582 | 6/1974 | Tennyson ........... 264/311 X |
| 3,894,901 | 7/1975 | Breher .............. 156/137 X |
| 3,956,448 | 5/1976 | Larson .............. 264/138 |
| 4,053,547 | 10/1977 | Redmond, Jr. ......... 264/229 X |
| 4,066,732 | 1/1978 | Redmond, Jr. ......... 264/229 |
| 4,113,823 | 9/1978 | Iida .............. 264/311 X |
| 4,123,832 | 11/1978 | Schultz ............ 156/169 X |
| 4,267,139 | 5/1981 | Scheibe et al. ........ 264/229 |
| 4,511,521 | 4/1985 | Standley ............ 264/311 X |
| 4,741,875 | 5/1988 | Carraro ............. 264/311 X |
| 4,883,448 | 11/1989 | Kobayashi et al. ........ 474/260 |
| 4,889,674 | 12/1989 | Krenkel et al. .......... 264/311 X |
| 4,953,280 | 9/1990 | Kitzmiller .......... 264/229 X |
| 5,043,103 | 8/1991 | Manchak, Jr. et al. ........ 264/311 X |

FOREIGN PATENT DOCUMENTS

| | | |
|---|---|---|
| 1239087 | 4/1967 | Fed. Rep. of Germany . |
| 1479300 | 6/1969 | Fed. Rep. of Germany . |
| 2808102 | 8/1978 | Fed. Rep. of Germany ...... 264/229 |
| 2600587 | 12/1987 | France ............. 264/229 |
| 7155 | 3/1968 | Japan .............. 264/229 |
| 528062 | 10/1940 | United Kingdom ........... 264/229 |

Primary Examiner—Karen Aftergut
Attorney, Agent, or Firm—Bell, Seltzer, Park & Gibson

[57] ABSTRACT

A method and an apparatus for making an endless, flat, flexible belt of pourable plastics include a core, especially a multiple core, as tension bearer, for example in a conveyor belt of polyurethane. Spaced apart support filaments extending transversely of the longitudinal direction of the belt are tightened in a mold approximately in the center plane of the belt to be cast so that the tension bearer will be placed as accurately as possible in the middle, based on the thickness of the belt to be produced. Subsequently the tension bearer is wound in longitudinal direction of the belt on the winding support formed by the support filaments. Thereupon liquid plastic material is poured into the mold and following that the support filaments protruding from the side surfaces of the belt are cut off upon termination of the curing.

6 Claims, 4 Drawing Sheets

METHOD TO MAKE AN ENDLESS, FLAT, FLEXIBLE BELT OF POURABLE PLASTICS

FIELD OF THE INVENTION

The instant invention relates to a method of making an endless, flat, and flexible belt of pourable plastics, including a core, especially a multiple core, as tension bearer, for example of a conveyor belt or a process belt made of polyurethane—especially by centrifugal casting—by pouring the liquid plastic material into a mold and subsequently curing it. The invention also relates to an apparatus for carrying out the process.

BACKGROUND OF THE INVENTION

Methods of making belts of the kind defined initially and corresponding apparatus are known. Conveyor or process belts must meet extremely high demands as regards resistance to abrasion and wear as well as structural strength. In the past, rubber was the material most frequently used for such belts. Nowadays, however, polyurethane materials are preferred because of the above mentioned high requirements in respect of abrasion resistance and structural strength. A core, especially a multiple core is integrated in the belt as a carrier or bearer of tensions in order that the tendency of elongation of belts made of such materials may be kept within reasonable limits. These tension bearers may be embodied by fabric mats, cord filaments, or steel wires.

A particular field of application of process belts are the so-called separators. They are machines used in the foodstuffs industry for separating such items as meat and fish from bones, cheese from its rind, and even bananas from their peel. The material to be separated, for instance bones with meat still on them, is fed under high pressure between a squeezing or process belt and a drum having a perforated circumferential surface. The substances to be yielded with preference, such as the meat, fish, cheese, or bananas are collected inside the drum in mashed form, while the wastage, such as bones and peels and the like accumulate outside of the drum. In view of the fact that the process belts used in such separators come into contact with foodstuffs, they must not be subject to wear and abrasion and be very robust and sturdy. Consequently it is particularly important that the process belt be made of an abrasion resistant material, such as polyurethane and that the elongation of the belt be restricted by a tension bearer incorporated in the belt.

It is a disadvantage of known methods of the kind mentioned above that it is not possible in making endless belts by centrifugal casting or displacement casting methods to place the core as the carrier of tension in the belt in such a position that it will be enclosed uniformly all around by the cast material. What is known, for instance, is a method of making toothed belts which include cord filaments or steel wires as the tension bearer which is wound around a center portion provided with the teeth. This has the disadvantage that, upon casting, the tension bearer is located at the base of the teeth in the region of the inner circumference of the toothed belt.

SUMMARY OF THE INVENTION

The instant invention is based on the technical problem of devising a method to produce an endless, flat, and flexible belt of pourable plastics, having a core, of the type mentioned initially, and of providing a corresponding apparatus which permits the tension bearer to be positioned as intended, especially in the middle with respect to the thickness of the belt.

That object is met, in accordance with the invention, in a method of the kind recited initially by the following steps: Spaced apart support filaments extending transversely of the longitudinal direction of the belt are tightened inside the mold approximately in the center plane of the belt to be cast; the tension bearer is wound on the support filaments in longitudinal direction of the belt; the casting process is carried out; and the support filaments projecting from the side surfaces of the belt are severed upon termination of the curing.

The technical problem underlying the instant invention further is resolved by an apparatus devised to carry out the method defined above and characterized by a drum-like frame including two parallel lateral discs whose outside contour corresponds to the inner contour of the casting mold and whose inside surfaces present the lateral definitions of the casting mold and which comprise means in the area of their outer edges for fastening of the support filaments extending between the discs, and further including spacers of a length corresponding to the width of the belt to be cast and being arranged between the discs.

The invention specifically has the advantages of providing a process which is easy to realize and yet very efficient, yielding the optimum in structural strength for conveyor belts and process belts. The support filaments which are tensioned in the mold transversely of the longitudinal direction of the belt are made especially of stiff material and are unaffected by the temperature of the pourable material for the belt (polyurethane) so that they present a kind of support fabric or backing which permits good location of the tension bearer by virtue of its own arrangement inside the mold. As the support filaments are embedded in the belt to be cast they should have the smallest possible diameter which is compatible with the tensile stress to which they will be subjected.

The apparatus according to the invention enables the method described above to be reduced to practice. To accomplish that, the support filaments are tensioned in a drum-like frame between the lateral discs thereof which are formed in the area of their outer edges with means for fastening of the support filaments and which are spaced apart in parallel with each other by a distance corresponding to the width of the belt to be cast.

As regards the method, preferably the support filaments are pulled tight in a frame outside of the mold, then the tension bearer is wound around, and subsequently the frame with the tension bearer wound around it is placed in the mold. This modification of the method offers more efficient usage of the mold since the winding procedure of the tension bearer takes place outside of the mold so that, while the casting goes on, another tension bearer for the next conveyor or process belt may be wound on another frame.

It is especially preferred to make use of a frame having two lateral discs and a plurality of spacers between them. At first, the support filaments are spread rather loosely between the two discs and then they are subjected to higher tensile stress, for instance by mechanically extending the spacers. This further development of the invention permits particularly high tensile stress of the support filaments and that in turn results in particularly accurate positioning of the tension bearer wound on the support filaments.

The strength of the winding base provided by the support filaments is enhanced by two more advantageous further developments according to which from 30 to 50 support filaments are used for each conveyor or process belt to be produced and, furthermore, the support filaments are portions of a single long thread which is tensioned in triangular or rectangular waveform.

Preferably, polyester is used as the material of the support filaments. Likewise conceivable is the preferential use of Kevlar as that will counteract any sagging of the support filaments during the winding of the tension bearer because it permits higher tension to be applied in the support filaments. In principle, the support filaments may consist of any desired material provided it offers the requisite strength and is resistant to the pourable material and the processing temperature applied.

It is provided as an advantageous further development of the apparatus according to the invention that one of the two discs of the drum-like frame is formed as a ring disc so that will facilitate the insertion of the frame in the mold. Furthermore, the liquid plastic material can be introduced readily into the interior of the mold through the opening in the annular disc.

Most preferably the means for fastening of the support filaments are embodied by holes in the discs having a diameter which is only slightly greater than the diameter of the support filaments. For instance, if the diameter of the support filaments is 0.6 mm, the diameter of the holes in the drum discs preferably should be approximately 1/10 mm greater to still provide adequate sealing in the casting mold.

It is especially preferred to have the opportunity of extending the spacers between the discs as that will make the parallel distance between the discs adjustable. The spacers may be extended mechanically or in any other suitable manner permitting the necessary tensioning force to be applied. The preferred means, however, are of mechanical nature such as eccentrics or knee levers.

Preferably said spacers comprise a threaded spindle connected to one of the discs. Rotation of the threaded spindle causes the disc to be moved in an axial direction to tension the support filaments extending between the discs. However, expanding the parallel distance between the discs could also be accomplished by means of pneumatic driven screws and other devices.

The spacers preferably have a triangular cross section, one edge of the triangle facing radially inwardly, as that will prevent any residues of pourable material from sticking to the spacers.

BRIEF DESCRIPTION OF THE DRAWING

The invention will be described further, by way of example, with reference to the accompanying drawings, in which.

DESCRIPTION OF THE PREFERRED EMBODIMENT

Figure 1:
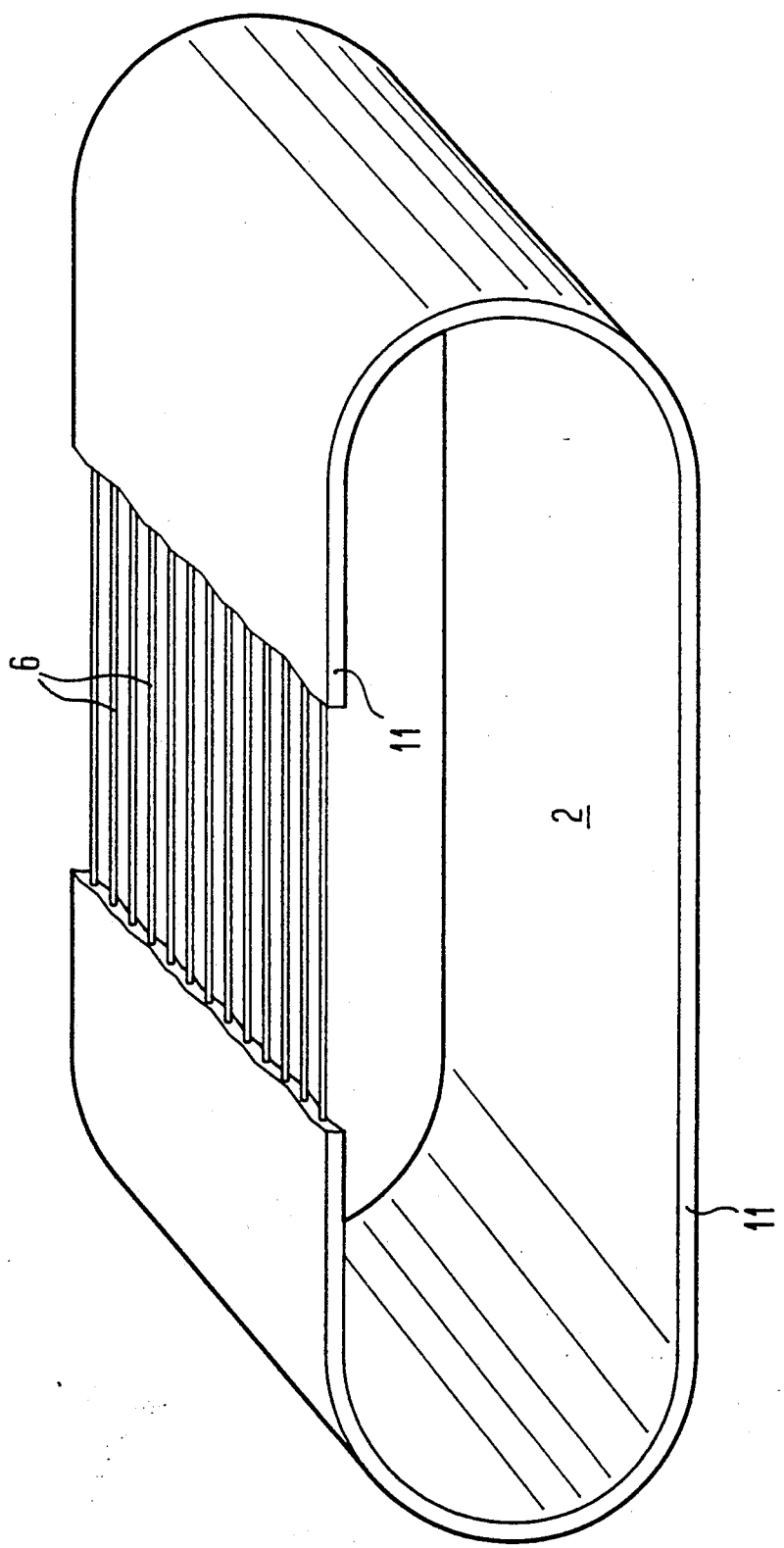
FIG. 1 is a perspective view of a finished endless belt, partly broken away to show the structure.

FIG. 1 illustrates an endless conveyor or process belt 2 made according to the invention. A multiple core 6 is incorporated in the belt 2 as a tension bearer. It is obtained by the offset winding of the core, as will be seen from the upper run of the belt which is shown broken away in FIG. 1. The tension bearer 6 is distributed uniformly throughout the width of the belt 2 and enclosed uniformly by the same with respect to the thickness of the belt material. The resistance to wear and tear of the conveyor or process belt is increased considerably by the central positioning of the tension bearer 6 in respect of the thickness of the belt material.

Figure 2:
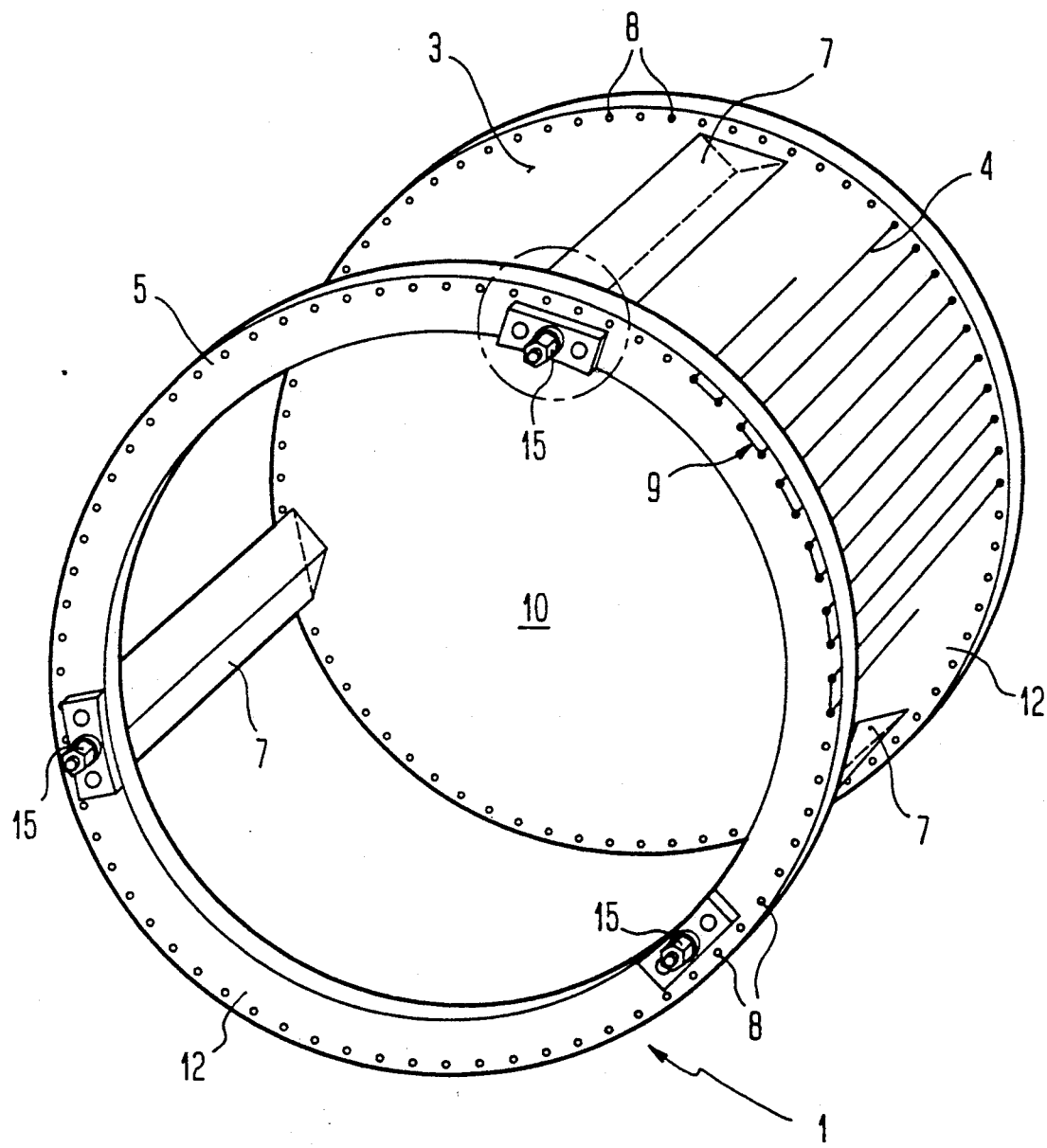
FIG. 2 is a perspective view of a drum-like frame for tensioning the support filaments.
Figure 3:
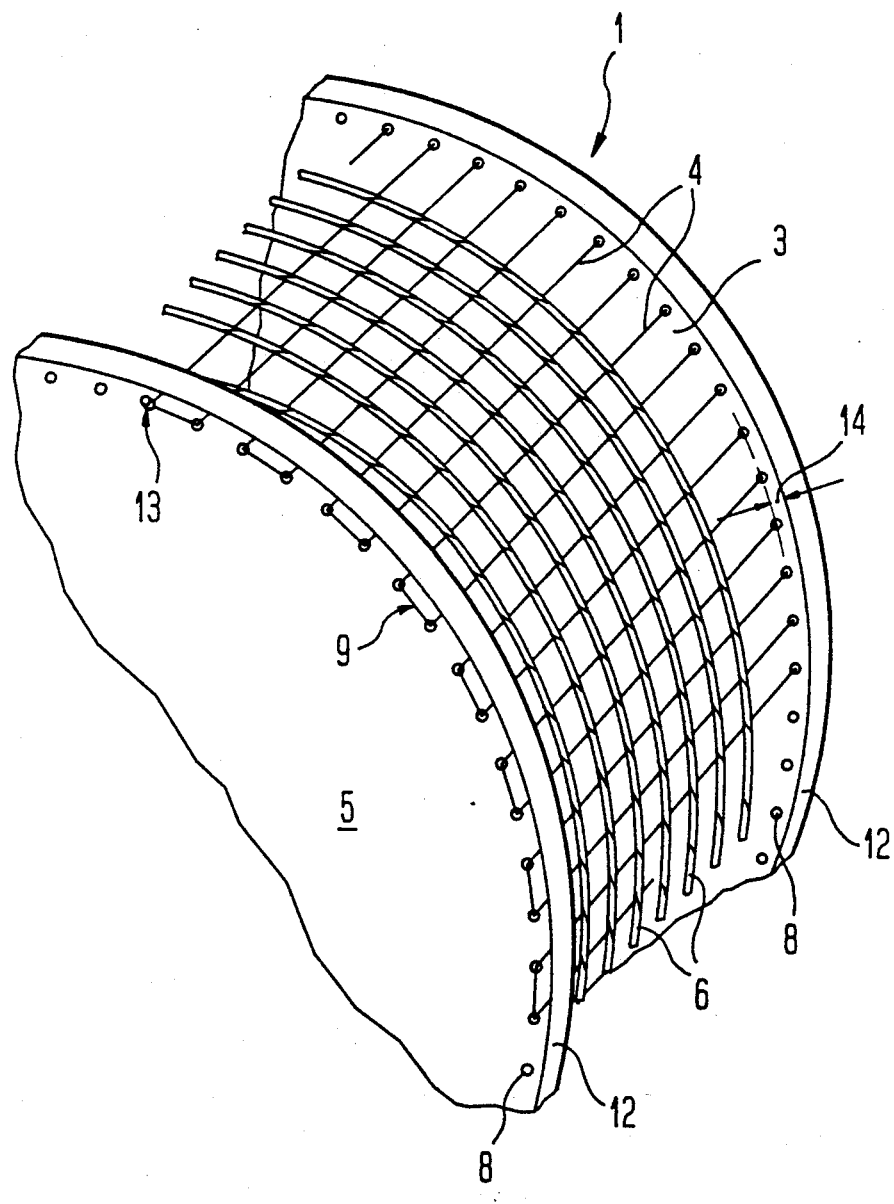
FIG. 3 is an enlarged perspective view corresponding to FIG. 2 and showing a segment of the drum-like frame.
Figure 4:
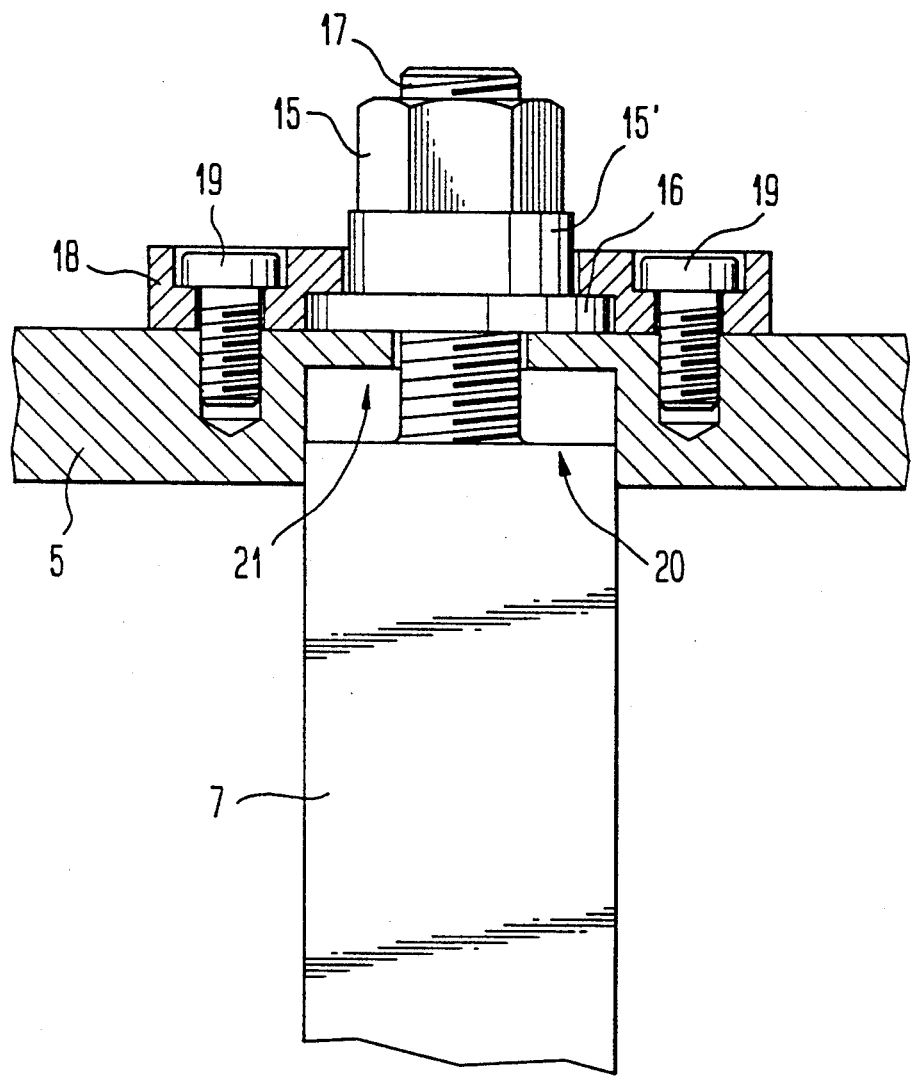
FIG. 4 is an enlarged view of the encircled portion of FIG. 2 showing a spacer with one disc in section and a threaded spindle.

FIG. 2 shows a drum-like frame I consisting essentially of two parallel lateral discs 3, 5 and a number of spacers 7 between them. The frame 1 serves to spread out the support filaments 4 which are threaded through alternate ones of holes 8 formed in the areas of the edges 12 of the discs 3, 5. The support filaments thus form a carrier structure or winding backing for the tension bearer 6 which is wound around it in a successive step of the method (FIG. 3). Each of the spacers 7 includes a threaded spindle 15 connected to one of the disc 3, 5 to expand the parallel distance between the discs 3, 5 in order to tension the support filaments 4 as referred to in more detail hereinafter. The construction of the threaded spindle is shown in FIG. 4. The outside circumference of the discs 3, 5 corresponds to the outer length of the conveyor or process belt 2. The desired location of the tension bearer 6 in a finished belt 2 can be determined by the location of the holes 8 in the discs 3, 5, specifically by their radial distance 14 (FIG. 3) from the outer peripheral edge of the discs 3, 5. The support filaments 4 in particular may result also from a single polyester or Kevlar filament which is threaded first through one of the holes 8 in the lateral discs 3, 5 and then immediately through the next adjacent one, as indicated by the arrow 9.

FIG. 3 presents an enlarged cutout of a segment of the drumlike frame 1 shown in FIG. 2 to illustrate the interrelation between the winding backing which consists of the support filaments 4 and the multiple core tension bearer 6. The radial distance 14 of the holes 8 from the outer peripheral edge of the discs 3, 5 determines the distance of the tension bearers 6 from the bottom and top surfaces of the future conveyor or process belt. The tighter the support filaments 4 are drawn between the lateral discs 3, 5 the less the tension bearer 6 will sag when being wound on the backing presented by the support filaments 4. Sufficient tensile stress in the support filaments 4 between the lateral discs 3, 5 is achieved by first spreading the support filaments rather loosely between the two lateral discs and then increasing the parallel distance between the discs 3, 5 by mechanically extending the spacers 7 of triangular cross section (FIG. 2). Upon tightening of the support filaments 4, the tension bearer 6 which is fastened initially, as the winding begins, at one of the lateral discs 3, 5, e.g. at the place marked by arrow 13, can be wound on the backing offered by the support filaments 4 in a plurality of substantially parallel paths in longitudinal direction (peripheral direction) of the conveyor or process belt. Subsequently part of the points of intersection between the support filaments 4 and the tension bearer 6 can be sealed by varnish or the like so as to maintain the relative positions of the support filaments 4 and the tension bearer 6 on the way into the casting mold.

The inner diameter of the casting mold corresponds to the outer diameter of the lateral discs 3, 5 and likewise defines the outer peripheral length of the conveyor or process belt 2 to be produced. In the mold, the discs 3, 5 form a seal between the space which will receive the pourable material and the interior of the drum. When the frame 1 has been put in the mold, and in case the manufacturing process to follow is centrifugal casting, an amount of pourable mass depending on the thickness of the belt to be cast is filled in and then the spinning or centrifuging and subsequent curing are performed. During this operation, the tension bearer 6 and the support filaments 4 become embedded in the poured substance which reacts to form a solid mass, namely the belt 2. When the centrifugal casting operation has been completed the drum-like frame 1 with the belt are taken out of the centrifugal casting mold which had been prepared previously with a parting compound. When the belt 2 is fully cured, the drum is disassembled and the finished conveyor or process belt 2 removed.

FIG. 4 presents an enlarged cut-out of the encircled segment in FIG. 2 showing one of the spacers 7 which includes an internally threaded spindle or nut 15 having an integral ring-shaped flange 15' and collar 16, all of which are connected to the ring-shaped disc 5. The collar 16 is held within a rigid plate 18 fixed upon the ring-shaped disc 5 by screws 19. As best seen in FIG. 4, the spindle 15 is riding upon a threaded shaft 17 which is integral with the spacer 7, so that rotation of the spindle or nut 15 on the shaft 17 causes movement of the spindle 15 in an axial direction and therefore causes a relative movement of the ring-shaped disc 5 in relation to the spacer 7 and the other disc 3.

The method according to the invention of producing an endless, flat, and flexible belt of pourable plastics according to FIG. 1 will be described below with reference to the apparatus shown in FIGS. 2 and 3.

To prepare the frame 1 consisting of the two discs 3, 5 and the spacers 7 between them for the casting process, the axial distance between the discs 3, 5 first is reduced to make it smaller than the desired width of the flexible belt to be cast. This reduction of the axial spacing is accomplished by mechanically shortening the spacers 7 for example, to move the top edge of the spacer to the position 21 shown in FIG. 4. Once the desired smaller axial initial distance between the discs 3, 5 has been adjusted, the support filaments 4 are spread between the lateral discs 3, 5 by threading a single long filament first through one of the holes 8 near the outer peripheral edge of the discs 3, 5 and then back through the next adjacent hole 8, as indicated by reference numeral 9 in FIGS. 2 and 3. In the beginning, the support filaments 4 are extended rather loosely between the two lateral discs 3, 5 until the whole frame 1 has been filled with support filaments 4 which then present a cylindrical generated surface of the frame 1. Upon fastening of the leading and trailing ends of the long thread which constitutes the support filaments 4, the axial distance or parallel spacing between the lateral discs 3, 5 is enlarged once more by mechanically extending the spacers 7 to an extended position, for example to the position as indicated in FIG. 4 at position 20, until the dimension corresponding to the width of the belt to be cast has been reached. During this operation the support filaments 4 are subjected to increased tensile stress between the two discs 3, 5. Extension of the spacers 7 and expanding the distance between the discs 3, 5 is accomplished by means of the threaded spindle 15 connected to the ring-shaped disc 5 and by rotating the spindle 15 in an appropriate direction. Rotation of the spindle 15 causes the disc 5 to be moved in an axial direction in order to tension the support filaments 4 extending between the discs.

The next process step resides in winding the tension bearer 6 in circumferential direction and in a plurality of substantially parallel windings on the backing formed by the support filaments 4. Again upon fastening of the leading and trailing ends of the tension bearer 6 at a respective one of the lateral discs 3, 5 and sealing of part of the points of intersection between the support filaments 4 and the tension bearer 6 by varnish, the tensioned frame 1 is put in the casting mold and the step of centrifugal casting is carried out with pourable plastics being added.

Upon curing of the belt material, the cast belt is separated from the frame after cutting of the support filaments 4 at the locations marked by reference numeral 9 and removing one of the lateral discs 3, 5 to be able to take out the cast belt. Following that, the support filaments 4 projecting from the side surfaces 11 of the belt 2 are cut off.

The result of the process is a flexible belt produced by centrifugal casting, as shown in FIG. 1, whose core 6 is located in the middle with respect to the thickness of the belt 2. The distance of the tension bearer 6 from the outer surface of the belt 2 is determined by the distance 14 at which the holes 8 are formed from the peripheral edges 12 of the discs 3, 5 (FIG. 3). The distance of the tension bearer 6 from the inner surface of the belt 2 is determined by the quantity of pourable material added.

what is claimed is:

1. A method of centrifugally casting an endless, flat, flexible belt of pourable plastic having a multiple strand core as a tension bearer at a generally center plane of the belt, the method comprising:
   providing spaced-apart filaments extending transversely of a longitudinal direction of the belt and positioned in a tensioned configuration corresponding to the center plane of the belt to be cast;
   winding the multiple strand core around the filaments to extend in the longitudinal direction of the belt to be cast; and
   centrifugally casting the belt by positioning the filaments and wound core in a desired position in a centrifugal casting mold, pouring liquid plastic material into the mold, casting the belt around the filaments and wound core, and curing the cast belt;
   whereby the positioning of the filaments and wound core in the desired position in the centrifugal casting mold provides the wound core as the tension bearer at the generally center plane of the cast belt.

2. A method of centrifugally casting an endless, flat, flexible belt, as set forth in claim 1, wherein the step of providing spaced-apart filaments includes stringing filaments between two frame members which define a width of the belt to be cast; and wherein the method further includes the step of separating the frame members from the filaments after casting of the belt, and severing portions of the filaments projecting from side surfaces of the cast belt.

3. A method of centrifugally casting an endless, flat, flexible belt, as set forth in claim 2, wherein the step of stringing the filaments between the frame members further includes providing two lateral discs having a plurality of spacers arranged between the discs as the frame members, initially threading the filaments loosely between the discs, and subsequently expanding a distance between the discs by extending the spacers so as to tension the filaments extending between the discs.

4. A method of centrifugally casting an endless, flat, flexible belt, as set forth in claim 1, 2 or 3, wherein the step of providing spaced-apart filaments includes providing from 30 to 50 spaced-apart transverse filaments per belt to be cast.

5. A method of centrifugally casting an endless, flat, flexible belt, as set forth in claim 4, wherein the step of providing filaments comprises providing a single long filament which is positioned transversely of the longitudinal direction of the belt to be cast in triangular or rectangular wave form to form the transverse spaced-apart filaments.

6. A method of centrifugally casting an endless, flat, flexible belt, as set forth in claim 5, wherein the step of providing filaments comprises providing polyester filaments.

* * * * *